Nov. 20, 1962     R. L. HORINEK     3,064,386
RODENT TRAP
Filed Sept. 11, 1959     5 Sheets-Sheet 5
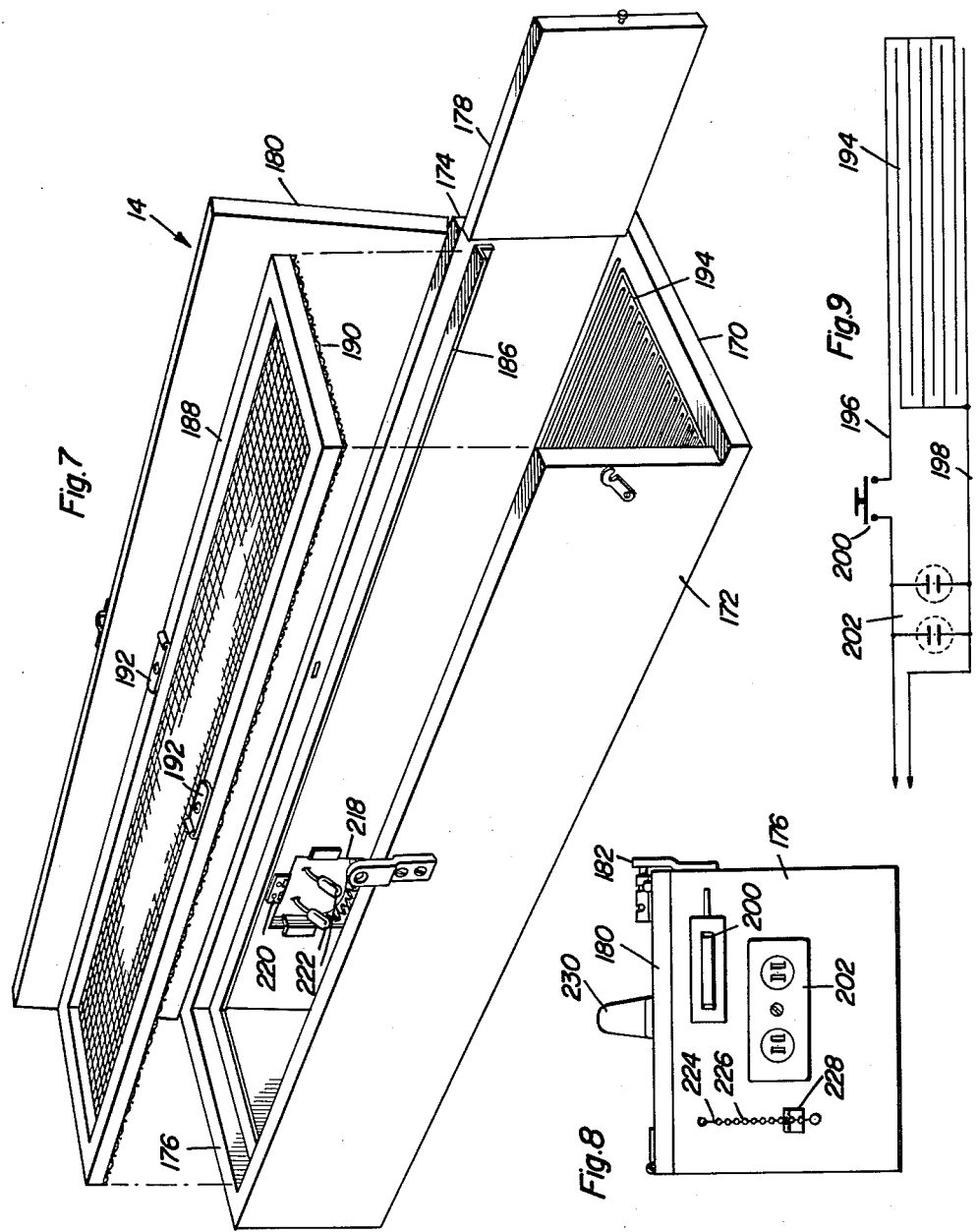
Robert L. Horinek
INVENTOR.

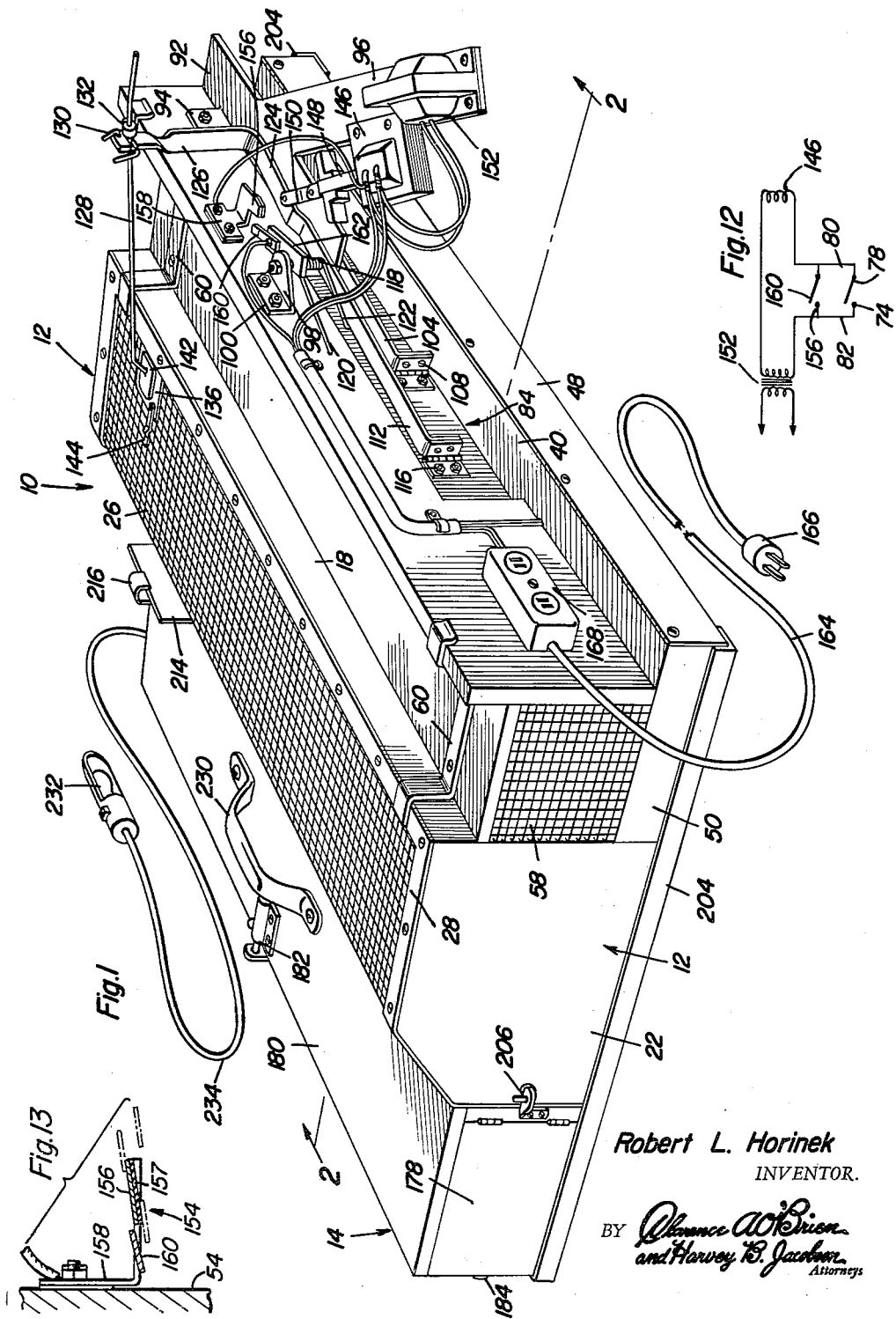

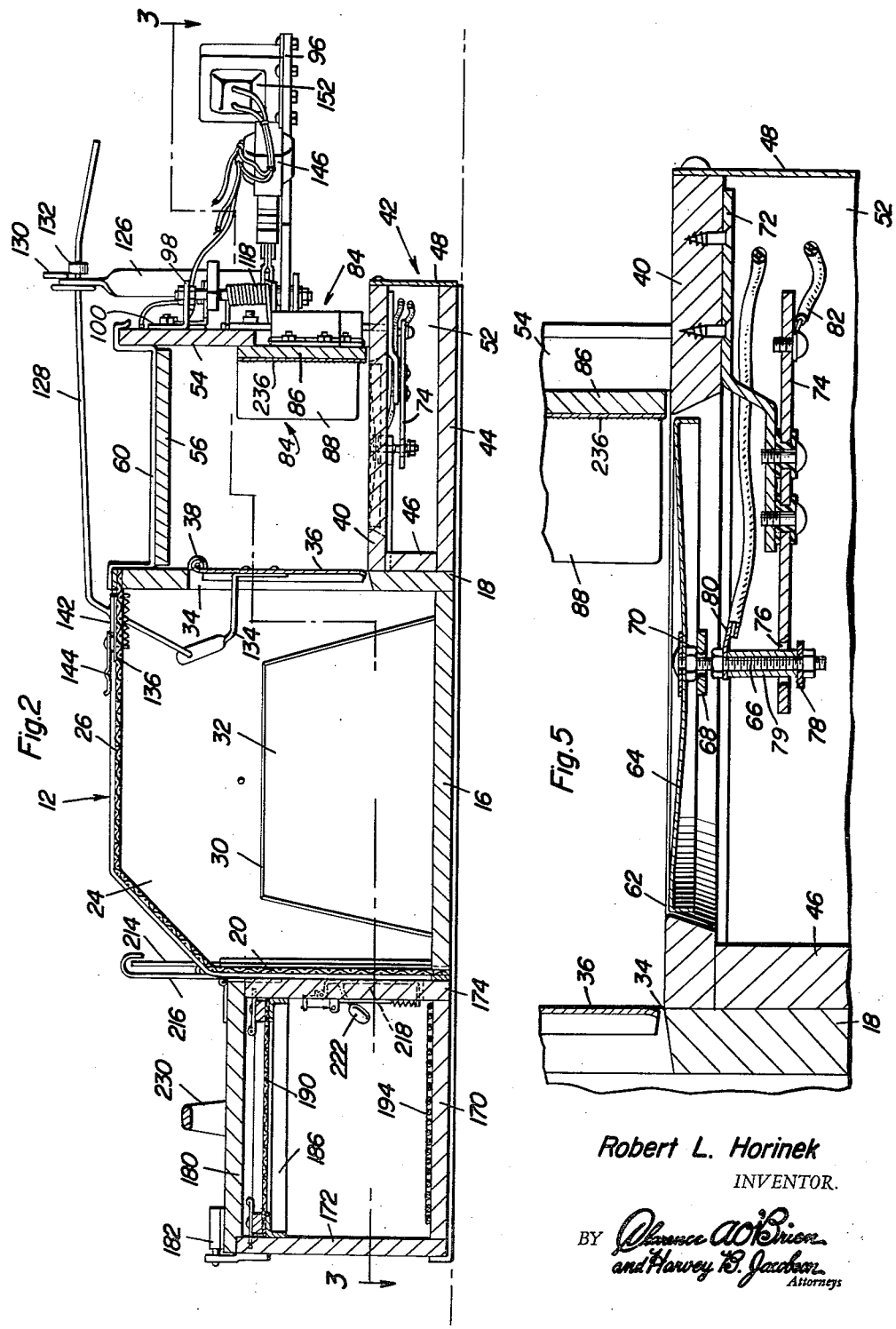

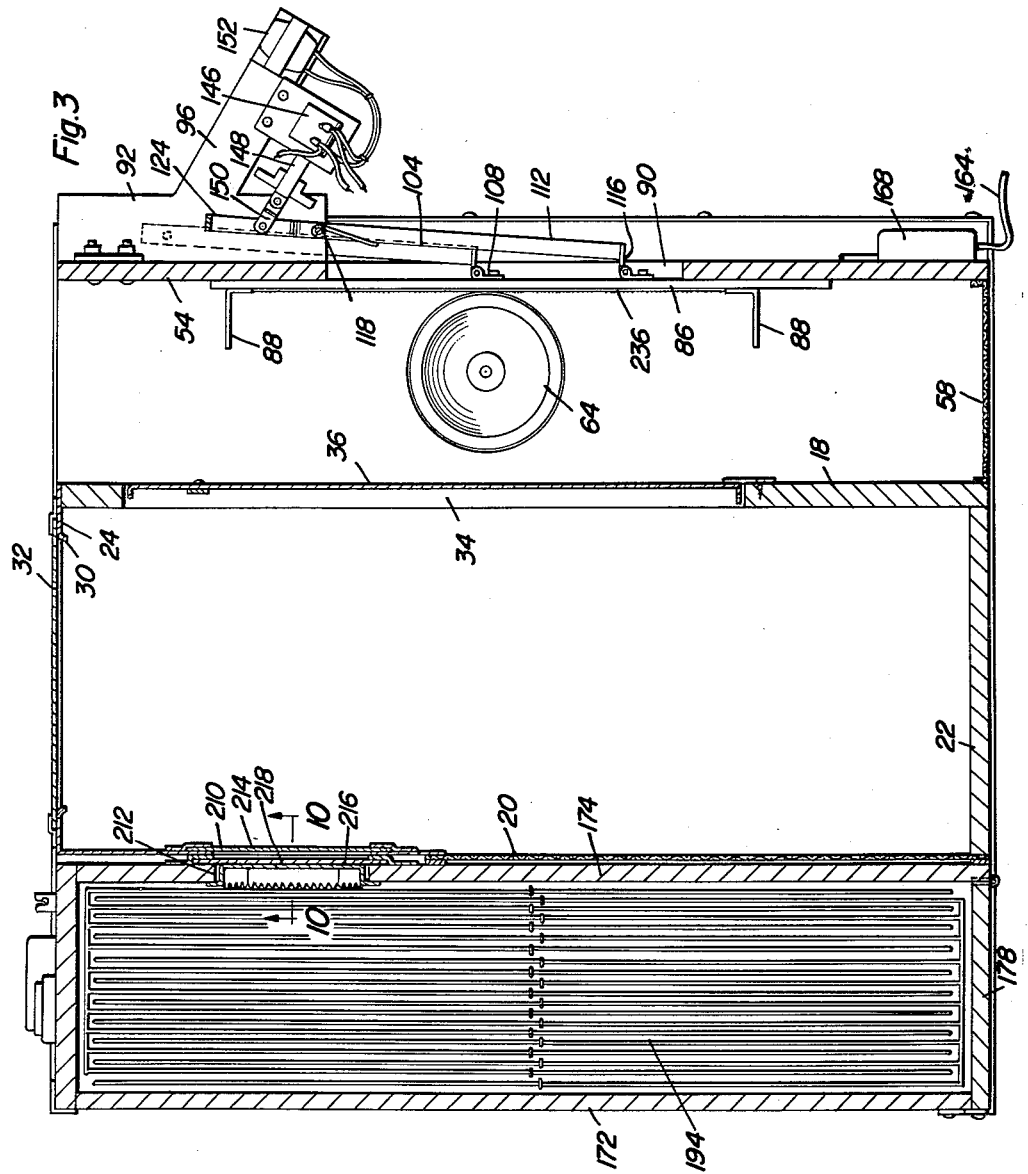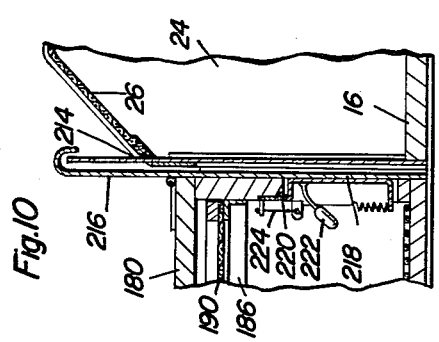

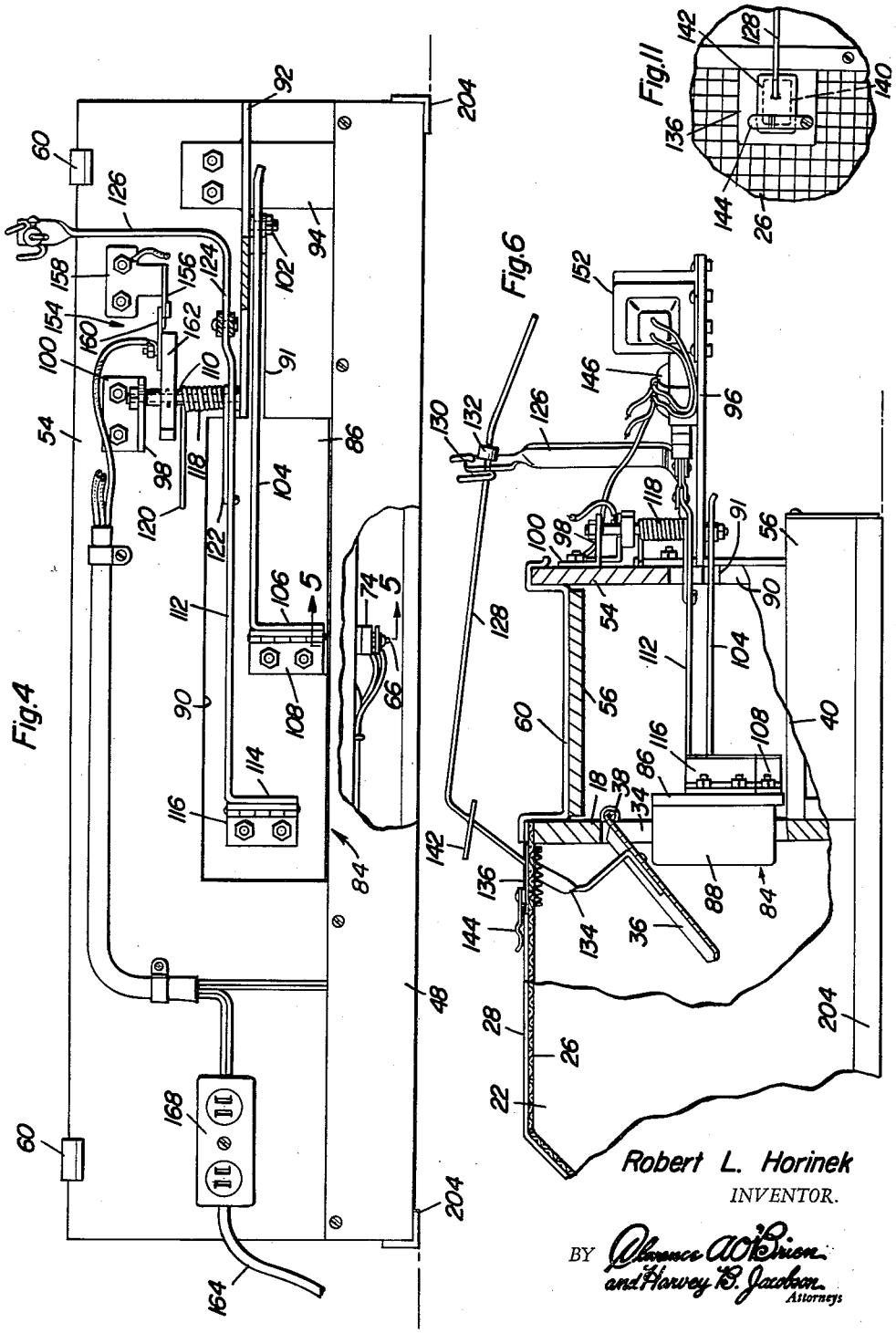

United States Patent Office 3,064,386
Patented Nov. 20, 1962

3,064,386
RODENT TRAP
Robert L. Horinek, 421 N. Walnut, Newkirk, Okla.
Filed Sept. 11, 1959, Ser. No. 839,492
5 Claims. (Cl. 43—65)

This invention relates in general to new and useful improvements in trap constructions, and more specifically to a novel rodent trap.

The major deficiencies of existing traps are generally of such a nature that the animal or rodent to be trapped must be in a certain position when the trap is tripped, otherwise, the trap is not effective. It is therefore the primary object of the invention to provide a novel rodent trap which is of a nature that once the actuating mechanism thereof is tripped, the rodent will definitely be trapped.

Another object of the invention is to provide a trap primarily intended for rodents, the trap including a base pan which, when tilted, actuates the trap mechanism, the trap mechanism including a very large pusher which will engage the rodent and force the rodent into a trap housing notwithstanding the fact that the rodent may be startled by the movement of the bait pan and begin to retreat from the area of the bait pan.

Another object of the invention is to provide a rodent trap which includes a large pusher for pushing the rodent through an opening into a housing wherein the trapped rodent is held, the pusher being acuated by electrical mechanism, the operation of which is initiated by a switch controlled by a bait pan, the electrical mechanism including a second switch disposed in parallel with the first switch enclosed upon the initial operation of the electrical mechanism so as to continue the movement of the pusher, when once initiated, so that the pusher continues to move and push the rodent into the holding chamber for the rodent notwithstanding the fact that the rodent is no longer standing on the bait pan.

Another object of the invention is to provide a rodent trap which is electrically operated and includes a bait pan type actuator, the bait pan having associated therewith a switch which includes a fixed contact with a circular opening therein, and the bait pan having a depending rod which passes through the circular opening, the depending rod forming a movable contact which will engage the fixed contact upon any tilting of the bait pan to assure the closing of the switch and the actuation of the electrical mechanism controlled by the switch.

A further object of the invention is to provide a trap primarily intended for trapping rodents, the trap including a large holding chamber having a doorway in one side thereof, the doorway being closed by a swinging door, there being disposed adjacent the doorway a bait pan, a pusher mounted for movement across the bait pan and through the door way, and actuating mechanism for operating the pusher upon the tilting of the bait pan to push a rodent from in the vicinity of the bait pan into the holding chamber, the operating mechanism for the pusher also automatically opening the door closing the doorway.

Still another object of the invention is to provide a novel rodent trap, the rodent trap including a holding chamber, means for forcing rodents into the holding chamber upon the tilting of a bait pan, and an electrocution chamber disposed adjacent the holding chamber whereby when it is desired to eliminate the trapped rodents, the trapped rodents may be allowed to pass into the electrocution chamber, after which an electrocution grid forming the floor of the electrocution chamber may be energized to electrocute the rodents.

A still further object of the invention is to provide a novel rodent trap, which trap is automatic in operation and effective to trap any rodent which trips the actuating mechanism thereof.

These together with other objects and advantages which will become subsequently apparent reside in the details of construction and operation as more fully hereinafter described and claimed, reference being had to the accompanying drawings forming a part thereof, wherein like numerals refer to like parts throughout, and in which:

FIGURE 1 is a perspective view of the rodent trap and shows the over-all details thereof;

FIGURE 2 is an enlarged transverse vertical sectional view taken substantially upon the plane indicated by the section line 2—2 of FIGURE 1 and shows the cross-sectional details of the rodent trap;

FIGURE 3 is an enlarged horizontal sectional view taken substantially upon the plane indicated by the section line 3—3 of FIGURE 2 and shows further the relationship of the various components of the rodent trap, including the holding chamber, the electrocution chamber, the bait pan and the pusher;

FIGURE 4 is an enlarged side view of the rodent trap of FIGURE 1 and shows the specific details of the means for operating the pusher;

FIGURE 5 is an enlarged fragmentary transverse vertical sectional view taken substantially upon the plane indicated by the section line 5—5 of FIGURE 4 and shows the details of the bait pan and the switch actuated thereby;

FIGURE 6 is an enlarged fragmentary end view of the trap with portions thereof broken away and shown in section and shows the pusher in its position within the doorway of the holding chamber and the door for the holding chamber doorway swung to its open position to permit the entrance of the pusher and a rodent which may be carried by the pusher;

FIGURE 7 is an enlarged exploded perspective view of the electrocution chamber and shows generally the details thereof;

FIGURE 8 is an end view of the electrocution chamber and shows generally the details thereof;

FIGURE 9 is a wiring diagram for the electrocution chamber;

FIGURE 10 is an enlarged fragmentary vertical sectional view taken substantially upon the plane indicated by the section line 10—10 of FIGURE 3 and shows the arrangement of the door way between the holding chamber and the electrocution chamber;

FIGURE 11 is an enlarged fragmentary plan view showing the holding chamber in the vicinity of the means for actuating the door thereof and shows the details of a latch preventing the opening of a door of the holding chamber;

FIGURE 12 is a wiring diagram showing the details of the means for actuating the pusher; and FIGURE 13 is an enlarged view in transverse section through the second control switch.

Referring now to the drawings in detail, it will be seen that the over-all details of the rodent trap, which is the subject of this invention, are illustrated in FIGURE 1. The rodent trap, which is generally referred to by the numeral 10, includes a holding chamber, generally referred to by the numeral 12, and an electrocution chamber, generally referred to by the numeral 14.

The holding chamber 12 includes a bottom wall 16, a pair of upstanding side walls 18 and 20, a pair of end walls 22 and 24, and a top wall 26. It is to be noted that the top wall 26 and the side wall 20 are formed of a screen material and are coextensive. The screen material is held in place by a frame member 28 which is best illustrated in FIGURE 1 of the drawings. Also, the end wall 24 has an access opening 30 therein which is normally closed by a vertically sliding door 32.

The side wall 18 is provided with an entrance opening or doorway 34 which is normally closed by a door 36 which is mounted for swinging movement by an upper horizontal hinge 38.

It is to be noted that the doorway 34 is disposed in spaced relation above the floor 16. A platform 40 is disposed exteriorly of the holding chamber 12 and the upper surface of the platform 40 is substantially coplanar with the lower edge of the doorway 34. The platform 40 is part of a housing unit, generally referred to by the numeral 42, the housing unit 42 including a base 44, upstanding side walls 46 and 48, and end walls 50 and 52.

A major portion of the platform 40 is encased by an upstanding wall 54 which is disposed inwardly of the right hand edge of the platform 40 as viewed in FIGURE 2, and extends upwardly therefrom. A top wall 56 extends between the wall 54 and the side wall 18 of the holding chamber 12. A screened end 58, as is best illustrated in FIGURE 1 is also provided. The top wall 56 is removably supported by suitable hangers 60 which are carried by the walls 18 and 54.

Referring now to FIGURE 5 in particular, it will be seen that the platform 40 is provided with a central opening 62 which extends therethrough. The opening 62 is circular in plan and flares downwardly. A bait pen 64 is positioned within the opening 62 and substantially fills the opening. The bait pan 64 is provided with a depending rod 66 which is secured to the central portion thereof. The rod 66 passes through an aperture provided therefor in an upper mounting strap or bar 68 and a nut member 70 carried by the rod 66 engages the mounting strap 68 to support the bait pan 64 for pivotal movement.

A bracket 72 is suitably secured to the underside of the platform 40 adjacent the opening 62. A fixed switch contact bar 74 is secured to the bracket 72 in insulated relation. The fixed contact 74 underlies the bait pan 64 and has a circular opening 76 therein aligned with the strap 68, the circular opening 76 receiving the lower portion of the rod 66. The rod 66 carries a nut assembly 78 which functions as a movable contact and which serves to secure an electrical wire 80 to the rod 66, said assembly 78 including a metallic sleeve 79 on the rod 66, which sleeve is engageable with the contact 74. A second electrical wire 82 is secured to the fixed contact 74.

A pusher assembly, generally referred to by the numeral 84, is carried by the wall 54. The pusher assembly 84 includes an upstanding pusher 86 to which a pair of removably disposed angle members 88 are secured. The uptanding wall 54 is provided with an opening 90 through which support means for the pusher 86 pass.

Referring now to FIGURES 3 and 4 in particular, it will be seen that the wall 54 supports a first mounting plate 92 which is carried by an upstanding bracket 94. The first mounting plate 92 has an outwardly directed extension 96, as is best illustrated in FIGURE 3. A second mounting plate 98 is secured to the wall 54 in offset relation with respect to the mounting plate 92, the mounting plate 98 being secured in place by means of an integral bracket 100.

A pivot pin 102 depends from the mounting plate 92 intermediate the ends thereof and a support arm 104 is pivotally mounted on the pivot pin 102. The support arm 104 has an offset end 106 which is connected to a hinge 108 which, in turn, is connected to the pusher 86. In this manner the support arm 104 is pivotally connected to the pusher 86.

A second pivot pin 110 extends between the mounting plates 92 and 98. A second support arm 112 is pivotally mounted on the pivot pin 110 and is provided with an offset end portion 114 remote from the pivot pin 110, the offset end portion 114 being connected to a hinge 116 carried by the pusher 86. In this manner the support arm 112 is pivotally connected to the pusher 86. It is to be noted that the support arms 104 and 112 are disposed in parallel relation and have parallel pivots. Accordingly, the movement of the pusher 86 is restricted to parallel movement between the position illustrated in FIGURE 2 and the position illustrated in FIGURE 6. A longitudinal slot 91 in one end portion of the wall 54 communicates with the opening 90 and accommodates the arm 104.

A spring 118 is carried by the lower portion of the pivot pin 110 above the support 112. The spring 118 has a first arm 120 which bears against the wall 54 and a second arm 122 which bears against the support arm 112 and urges the pusher 86 to its retracted position of FIGURE 2.

As is best illustrated in FIGURE 4, the support arm 112 has an extension 124 which extends beyond the pivot pin 110 and which terminates in an upstanding portion 126. A rod 128 passes through the upstanding portion 126 and is suitably retained in place by a wire fastener 130. The rod is provided with a stop collar 132 which is adjustably mounted on the rod 128 to permit the proper adjustment between the rod 128 and the upstanding portion 126. The other end of the rod 128 is pivotally connected to an arm 134 which is rigidly secured to the door 36. Thus when the support arm 112 is pivoted to swing the pusher 86 towards the doorway 34, the door 36 is automatically swung to an open position, as is best illustrated in FIGURE 6.

As is best illustrated in FIGURE 11, the top wall 26 of the holding chamber 12 is provided with a fitting 136 through which the rod 128 passes. The fitting 136 has an opening 140 therein to provide for the swinging movement of the rod 128. When the door 36 is closed, a plate 142 on the rod 128 closes the opening 140. Also, operation of the door 36 may be prevented by means of a swingable latch member 144 carried by the fitting 136 and swingable to a position overlying the plate 142 to prevent movement of the rod 128.

The pusher 86 is actuated by means of an electrical operator in the form of a solenoid 146 which is mounted on the extension 96. The solenoid 146 has an operating rod 148 which is retracted when the solenoid 146 is energized. The operating rod 148 is connected to the extension 124 of the support 112 by suitable linkage 150.

In the operating form of the invention, the solenoid 146 operates on a lower voltage than the normal supply and accordingly a transformer 152 is provided. However, if the solenoid 146 is of the normal operating voltage, the transformer 152 may be eliminated. On the other hand, it is desirable that the voltage of the solenoid 146 be held to a minimum to prevent arcing of the contacts of the switch controlled by the bait pan 64.

Operation of the solenoid 146 is also controlled by a second switch, generally referred to by the numeral 154. The second switch 154 includes a fixed contact 156 supported by a suitable bracket 158 from the wall 54. A movable contact 160 is supported by a support member 162 on the pivot pin 110 for rotation with the pivot pin 110 and the support arm 112. It is to be noted that the contacts 156 and 160 have laterally inclined ends to assure the caming of the two contacts one upon the other. The contact 156 has an insulated under surface 157. As a result, when the movable contact 160 swings into engagement with the contact 156, it will ride up onto the contact 156 and pass thereover. On the return swinging movement of the movable contact 160, it will pass beneath the fixed contact 156 and engage the insulated undersurface 157 thereof. Thus the electrical connection is made during only one direction of movement of the contact 160.

The electrical mechanism of the trap 10 also includes a power line 164 which has a plug 166 on one end thereof for plugging into any conventional electrical outlet. Also, incorporated in the power line 164 is an outlet box 168, the purpose of which will be described in detail hereinafter.

In the operation of the rodent trap, bait is placed on the bait pan 64. As the rodent walks along the platform 40 and engages the bait pan 64 in an attempt to reach the bait, which bait is placed in the central part of the bait pan 64, the rodent will step on the edge of the bait pan 64 with the result that it will tilt and engage the sleeve 79 of the assembly 78 with the contact 74, thus closing the circuit to the solenoid 146. As soon as the solenoid 146 is energized, it will begin the swinging movement of the pusher 86. Once the swinging movement of the pusher 86 is initiated, the switch 154 will close and continue the operation of the solenoid 146 even though the rodent has sensed the movement of the pusher 86 and has stepped off of the bait pan 64. Thus once the operation of the pusher 86 has been initiated, the full swinging movement of the pusher 86 is assured. At this time it is pointed out that the movement of the pusher 86 is sufficiently fast to prevent a rodent from running from the vicinity of the bait pan 64 without being contacted by the pusher 86. Further, the angle members 88 disposed adjacent the ends of the pusher 86 form barriers to prevent the rodent from running past the pusher 86 even after being engaged by the pusher 86. Therefore, once the bait pan 64 is tilted to actuate the solenoid 146, the trapping of the rodent is assured.

It is intended that the trap 10 accumulate a large number of rodents before the holding chamber 12 is emptied. For this reason, the platform 40 is disposed above the elevation of the floor 16 of the holding chamber 12. If not, other rodents already within the holding chamber 12 may be in the path of a rodent being pushed therein by the pusher 86 and trapping of the rodent would not be assured.

The electrocution chamber 14 is separate and apart from the remainder of the trap 10 and is removable therefrom. The electrocution chamber 14 includes a base 170 having upstanding sides 172 and 174, a fixed end 176, a swinging end 178 and a swinging top 180. The end 178 and the top 180 are hingedly connected to the side 174. A suitable latch 182 is provided for holding the top 180 in place and a similar latch 184 is provided for holding the end 178 in place.

A support frame 186 extends about the upper portions of the sides 172 and 174 and the end 176. A frame 188 seats on the support frame 186 beneath the top 180. The frame 188 has a screen 190 secured to the underside thereof. Suitable latch members 192 are carried by the frame 188 for preventing upward movement of the frame 188. The purpose of the separate frame 188 and the screen 190 is to permit the inspection of the interior of the electrocution chamber 14 without the escape of rodents therefrom. Thus, the top 180 may be swung to its open position and the interior of the electrocution chamber 14 is inspected through the screen 190.

The floor 170 of the electrocution chamber 14 is provided with a grid 194 which functions as an electrocution grid. It is to be noted from FIGURE 9 that the grid 194 is provided with a plurality of wires disposed in parallel relation with every other wire being connected to a lead wire 196 and the other alternating wires being connected to the lead wire 198. Thus when the rodent bridges any of the two wires of the grid 194, current will flow through the rodent and bring about the electrocution thereof. The energization of the grid 194 is controlled by a manually actuated switch 200. It is to be noted that a suitable outlet box 202 is connected to the wires 196 and 198. The ends of the wires 196 and 198 will be provided with a suitable plug to permit the plugging in of the wires 196 and 198 into the outlet box 168.

It is to be noted that the rodent trap 10 includes a frame in the form of a pair of angle members 204. The electrocution chamber 14 seats between the angle members 204, but is not rigidly secured thereto as are other components of the trap 10. However, the electrocution chamber 14 is held in position adjacent the holding chamber 12 by an interlocking fitting 206 which is automatically engaged when the electrocution chamber 14 is positioned within the angle members 204. This is best illustrated in FIGURE 1.

The side wall 20 of the holding chamber 12 is provided with a doorway 210 which is aligned with a doorway 212 in the side wall 174 of the electrocution chamber 14. The doorway 210 is normally closed by a vertically sliding door 214. A similar vertically sliding door 216 normally closes the doorway 212. It is to be noted that the doors 214 and 216 extend upwardly above adjacent portions of the trap 10 to facilitate the operation thereof.

A second door 218 further closes the doorway 212. The door 218 is mounted for swinging movement about an upper horizontal hinge 220 and is provided with weights 222 to assure its return into closed position by gravity. The door 218 is intended to permit the rodents to pass one at a time from the holding chamber 12 into the electrocution chamber 14. If it is desired to hold the door 218 in an open position, this may be accomplished by means of a cable 224 which passes through the end wall 176 and terminates in a chain 226. The chain 226 is associated with a latch element 228 which holds the chain in a last placed position.

It is to be noted that the electrocution chamber 14 is provided with a handle 230 which is secured to the top 180. In this manner the removal and carrying of the electrocution chamber 14 is facilitated. Accordingly, after the rodents have been electrocuted, the entire electrocution chamber 14 may be removed from the remainder of the trap 10 and carried to such a place where the rodents are to be disposed of.

A light 232 is also provided. The light 232 is provided with a cord 234 which may be coupled into the outlet 202. It is intended that the light 232 be placed into the electrocution chamber 14 so as to attract the trapped rodents into the electrocution chamber 14, the rodents, upon seeing the light 232, believing they have a mode of escape.

At this time it is pointed out that the screen 58 may be removed, if desired, to permit bait to be placed in this end portion of the trap. In other words, the bait will be located behind the screen 58 after the screen is replaced. In this manner the rodents are attracted.

The pusher 86 may be provided with a suitable friction material, such as sandpaper 236. Thus when the pusher 86 engages a rodent, there is less chance of relative movement of the rodent with respect to the pusher.

Another advantage utilized in the transformer 152 is that when a low voltage circuit is utilized, the circuit may also have incorporated therein a door bell type buzzer which may be placed in a suitable position within one's residence to function as an alarm.

Although the trap is primarily used in conjunction with a bait, it is also very effective when set against the burrows of rodents and a suitable cover is placed over the end of the trap and the burrow so that the rodents must run across the trap. Also, the electric grid 194 may be placed in the holding chamber 12 in lieu of being placed in the electrocution chamber 14 if it is desired to do so.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:
1. A rodent trap comprising an elongated holding chamber including a top, bottom, side and end walls, one of said side walls having an elevated opening therein, an elongated housing unit paralleling the holding chamber in side-abutting engagement with said one side wall thereof and communicating therewith through the opening, said housing unit being closed at one end and open at its other end for the entry of a rodent, said housing unit including a top, a side wall having an opening threin opposite the first-named opening, and an elevated platform flush with the lower wall of said first-named opening, said platform having a circular opening therein between the first and second-named openings, brackets mounted exteriorly on the second-named side wall, a pair of parallel arms pivotally mounted for horizontal swinging movement on said brackets and operable in the housing unit through the second-named opening, an elongated pusher hingedly mounted on the free ends of the arms and operable thereby between the side walls normal thhereto, means comprising a solenoid on one of the brackets operatively connected to one of the arms for actuating the pusher, means for controlling the first-named opening, and means operable by the rodent for energizing the solenoid, the last-named means including a bar traversing the circular opening and having an aperture therein, a bait pan, for receiving the rodent thereon for actuation thereby, rockably mounted on the bar and operable in the circular opening, a switch comprising a contact bar secured beneath the platform and electrically connected to the solenoid, said contact bar extending beneath the bait pan and having an opening therein vertically aligned with the aperture, a depending rod on the bait pan engaged in the aperture for rockably retaining said bait pan on the bar, and means for electrically connecting a conductor from a source of current to the rod, said rod being operable in the contact bar opening and engageable with the contact bar for closing an electrical circuit to the solenoid, said pusher being operable across the bait pan for sweeping the rodent therefrom through the first-named opening into the holding chamber.

2. A rodent trap in accordance with claim 1, wherein the second-named means includes an extension on the pivoted end of said one arm terminating in an upstanding end portion, a gravity-closed door for said first-named opening hingedly suspended on the first-named side wall, and an angulated rod operable through the holding chamber top and having one end affixed to the door and its other end portion connected to said upstanding end portion of the extension.

3. A rodent trap in accordance with claim 2, said holding chamber top having an opening therein accommodating the rod, and a plate on the rod for closing the last-named opening when said rod is in door-closing position.

4. A rodent trap in accordance with claim 3, together with means for locking the rod against movement when the door is in closed position.

5. A rodent trap in accordance with claim 4, said plate being engageable with the holding chamber top over said opening therein, said locking means including a latch on said holding chamber top engageable with the plate.

References Cited in the file of this patent
UNITED STATES PATENTS

| | | |
|---|---|---|
| 982,001 | Hardegen | Jan. 17, 1911 |
| 999,705 | Dye | Aug. 1, 1911 |
| 1,249,337 | Cornelius | Dec. 11, 1917 |
| 1,442,252 | Coleman | Jan. 16, 1923 |
| 1,464,697 | Connolly | Aug. 14, 1923 |
| 2,191,229 | Ford | Feb. 20, 1940 |
| 2,229,300 | Montroy et al. | Jan. 21, 1941 |
| 2,312,209 | Colwell et al. | Feb. 23, 1943 |
| 2,677,209 | Hutchison | May 4, 1954 |